(12) United States Patent
Masuda et al.

(10) Patent No.: US 11,460,703 B2
(45) Date of Patent: Oct. 4, 2022

(54) LASER OPTICAL PROJECTION MODULE AND WEARABLE DEVICE HAVING THE SAME

(71) Applicant: MEGA1 COMPANY LTD., New Taipei (TW)

(72) Inventors: Makoto Masuda, New Taipei (TW); Han-Chiang Wu, New Taipei (TW)

(73) Assignee: MEGA1 COMPANY LTD., New Taipei (TW)

( * ) Notice: Subject to any disclaimer, the term of this patent is extended or adjusted under 35 U.S.C. 154(b) by 170 days.

(21) Appl. No.: 17/004,242

(22) Filed: Aug. 27, 2020

(65) Prior Publication Data
US 2021/0072546 A1    Mar. 11, 2021

Related U.S. Application Data

(60) Provisional application No. 62/897,993, filed on Sep. 9, 2019.

(51) Int. Cl.
*G02B 27/01* (2006.01)
*G02B 26/08* (2006.01)

(52) U.S. Cl.
CPC ..... *G02B 27/0172* (2013.01); *G02B 26/0833* (2013.01); *G02B 2027/0178* (2013.01)

(58) Field of Classification Search
None
See application file for complete search history.

(56) References Cited

U.S. PATENT DOCUMENTS

| | | | |
|---|---|---|---|
| 6,717,740 B2 | 4/2004 | Miyagawa | |
| 7,034,972 B2 | 4/2006 | Ando | |

(Continued)

FOREIGN PATENT DOCUMENTS

| | | |
|---|---|---|
| CN | 201293869 Y | 8/2009 |
| CN | 105579883 A | 5/2016 |

(Continued)

OTHER PUBLICATIONS

Hakan Erey, et al., "Microlens array-based exit pupil expander for full color display applications", Proc. SPIE, vol. 5456, in Photon Management, Strasbourg, France, Apr. 2004.

(Continued)

*Primary Examiner* — Toan Ton
*Assistant Examiner* — Danell L Owens
(74) *Attorney, Agent, or Firm* — Li & Cai Intellectual Property (USA) Office

(57) ABSTRACT

A laser optical projection module and a wearable device are provided. The laser optical projection module includes a laser beam scanning device, a first optical lens assembly on a side of the laser beam scanning device, and a microlens array. The laser beam scanning device has a laser light source and a micro-electro-mechanical micromirror. A laser beam emitted from the laser light source is reflected and projected by the swinging micro-electro-mechanical micromirror. Light spots of the laser beam emitted from the laser beam scanning device are reduced by the first optical lens assembly, and a pitch between the light spots is decreased. The microlens array having microlenses is configured on a side of the first optical lens assembly and on a projecting direction of the laser beam. A uniform imaging image formed by uniform and parallel imaging lights is obtained after the laser beam passes through the microlenses.

9 Claims, 7 Drawing Sheets

(56) References Cited

U.S. PATENT DOCUMENTS

| | | |
|---|---|---|
| 7,445,345 B2 | 11/2008 | Itoh et al. |
| 7,791,810 B2 | 9/2010 | Powell |
| 8,837,050 B2 | 9/2014 | Hudman |
| 9,798,153 B2 | 10/2017 | Ide |
| 9,817,242 B2 | 11/2017 | Masson et al. |
| 10,025,093 B2 | 7/2018 | Wall et al. |
| 10,101,589 B2 | 10/2018 | Endoh |
| 10,147,235 B2 | 12/2018 | Bell |
| 2008/0212194 A1 | 9/2008 | Powell et al. |
| 2017/0010473 A1* | 1/2017 | Ide .................. G02B 3/0056 |

FOREIGN PATENT DOCUMENTS

| | | | |
|---|---|---|---|
| CN | 106164748 A | | 11/2016 |
| CN | 108398791 A | | 8/2018 |
| CN | 109073882 A | | 12/2018 |
| JP | 2010276757 A | * | 12/2010 |
| TW | I258985 B | | 7/2006 |

OTHER PUBLICATIONS

G. Basset, A. Luu-Dinh, C. Schneider, F. Herzog, F. Zanella, A. Mustaccio, "Advanced Microlenses Fabrication Techniques", CSEM Scientific and Technical Report, CSEM, 2016, p. 59.
National Academy for Educational Research, "Achromatic lens", https://terms.naer.edu.tw/detail/1298605/.

* cited by examiner

LASER OPTICAL PROJECTION MODULE AND WEARABLE DEVICE HAVING THE SAME

CROSS-REFERENCE TO RELATED PATENT APPLICATION

This application claims priority to the U.S. Provisional Patent Application Ser. No. 62/897,993 filed on Sep. 9, 2019, which application is incorporated herein by reference in its entirety.

Some references, which may include patents, patent applications and various publications, may be cited and discussed in the description of this disclosure. The citation and/or discussion of such references is provided merely to clarify the description of the present disclosure and is not an admission that any such reference is "prior art" to the disclosure described herein. All references cited and discussed in this specification are incorporated herein by reference in their entireties and to the same extent as if each reference was individually incorporated by reference.

FIELD OF THE DISCLOSURE

The present disclosure relates to an optical projection module and a wearable device, and more particularly to a laser optical projection module that uses a laser light as a light source and a wearable device having the same (for example, eyeglasses), so as to provide an augmented reality (AR) display image.

BACKGROUND OF THE DISCLOSURE

Display apparatus systems or AR systems that are capable of see-through and that provide a mixed reality mode allow a user of a gaming or mobile apparatus to view the surrounding environment through a transparent or semi-transparent display. Not only can the user observe the surrounding environment via the transparent or semi-transparent display of the apparatus, but virtual images can simultaneously be superimposed on or shown in the surrounding environment.

These display apparatuses require an optical engine to project images, and a transparent or semi-transparent display to perform its intended functions. After the optical engine receives information, e.g., an image from another apparatus, such information is projected to the transparent or semi-transparent display. Since the display apparatuses are subject to limitations from the volumes of various components and from the light source, one of the most important issues of this field is to reduce the volume of the display apparatuses, while at the same time providing a wider field of view and a higher resolution.

SUMMARY OF THE DISCLOSURE

In response to the above-referenced technical inadequacies, the present disclosure provides a laser optical projection module that reduces a size of a component and enhances a resolution of an image.

In one aspect, the present disclosure provides a laser optical projection module that includes a laser beam scanning device, a first optical lens assembly, and a microlens array. The laser beam scanning device has a laser light source and a micro-electro-mechanical micromirror. A laser beam emitted from the laser light source is projected to the swinging micro-electro-mechanical micromirror and then reflected to corresponding pixels to scan out a graphic image. The first optical lens assembly is configured on a side of the laser beam scanning device and has a plurality of first lenses. Light spots of the laser beam emitted from the laser beam scanning device are reduced by the first lenses, and a pitch between the light spots is decreased. The microlens array is configured on a side of the first optical lens assembly and on a projecting direction of the laser beam passing through the first optical lens assembly. The microlens array has a plurality of microlenses which are arranged in an array, and a uniform imaging image formed by the uniform and parallel imaging lights is obtained after the laser beam passes through the microlenses.

In view of the current technical inadequacies, there is also a need to provide a wearable device that not only allows the size of a component to be reduced and the resolution of an image to be enhanced, but also integrates with an optical engine that has small volume, high luminance, and low power consumption and heat generation.

In another aspect, the present disclosure provides a wearable device that includes a laser beam scanning device, a first optical lens assembly, a microlens array, a second optical lens assembly, and an optical see-through element. The laser beam scanning device has a laser light source and a micro-electro-mechanical micromirror. A laser beam emitted from the laser light source is projected to the swinging micro-electro-mechanical micromirror and then reflected to corresponding pixels to scan out a graphic image. The first optical lens assembly is configured on a side of the laser beam scanning device and has a plurality of first lenses. Light spots of the laser beam emitted from the laser beam scanning device are reduced by the first lenses, and a pitch between the light spots is decreased. The microlens array is configured on a side of the first optical lens assembly and on a projecting direction of the laser beam passing through the first optical lens assembly. The microlens array has a plurality of microlenses which are arranged in an array. A uniform imaging image formed by the uniform and parallel imaging lights is obtained after the laser beam passes through the microlenses. The second optical lens assembly is configured on a side of the microlens array to receive the imaging image of the microlens array, and the imaging image is enlarged by the second optical lens assembly. The optical see-through element is configured on a side of the second optical lens assembly. The optical see-through element includes a plurality of semi-transflective lenses that are adhesively bonded. Each of the semi-transflective lenses has a multilayered coating to receive the imaging image enlarged by the second optical lens assembly.

One of the beneficial effects of the present disclosure is that, in the laser optical projection module provided herein, since the first optical lens assembly is arranged between the laser beam scanning device and the microlens array, the size of each of the light spots generated by the laser beam scanning device can be reduced by the first optical lens assembly. In this way, a size of the microlens array can be reduced and a higher resolution can be provided. In addition, in the present disclosure, the laser optical projection module is applied to a wearable device (for example, AR eyeglasses). The micro-electro-mechanical micromirror is used by the laser optical projection module as an optical engine, and has the advantages of small volume, high luminance, and low power consumption and heat generation.

These and other aspects of the present disclosure will become apparent from the following description of the embodiment taken in conjunction with the following drawings and their captions, although variations and modifications therein may be affected without departing from the spirit and scope of the novel concepts of the disclosure.

BRIEF DESCRIPTION OF THE DRAWINGS

The present disclosure will become more fully understood from the following detailed description and accompanying drawings.

DETAILED DESCRIPTION OF THE EXEMPLARY EMBODIMENTS

Figure 1:
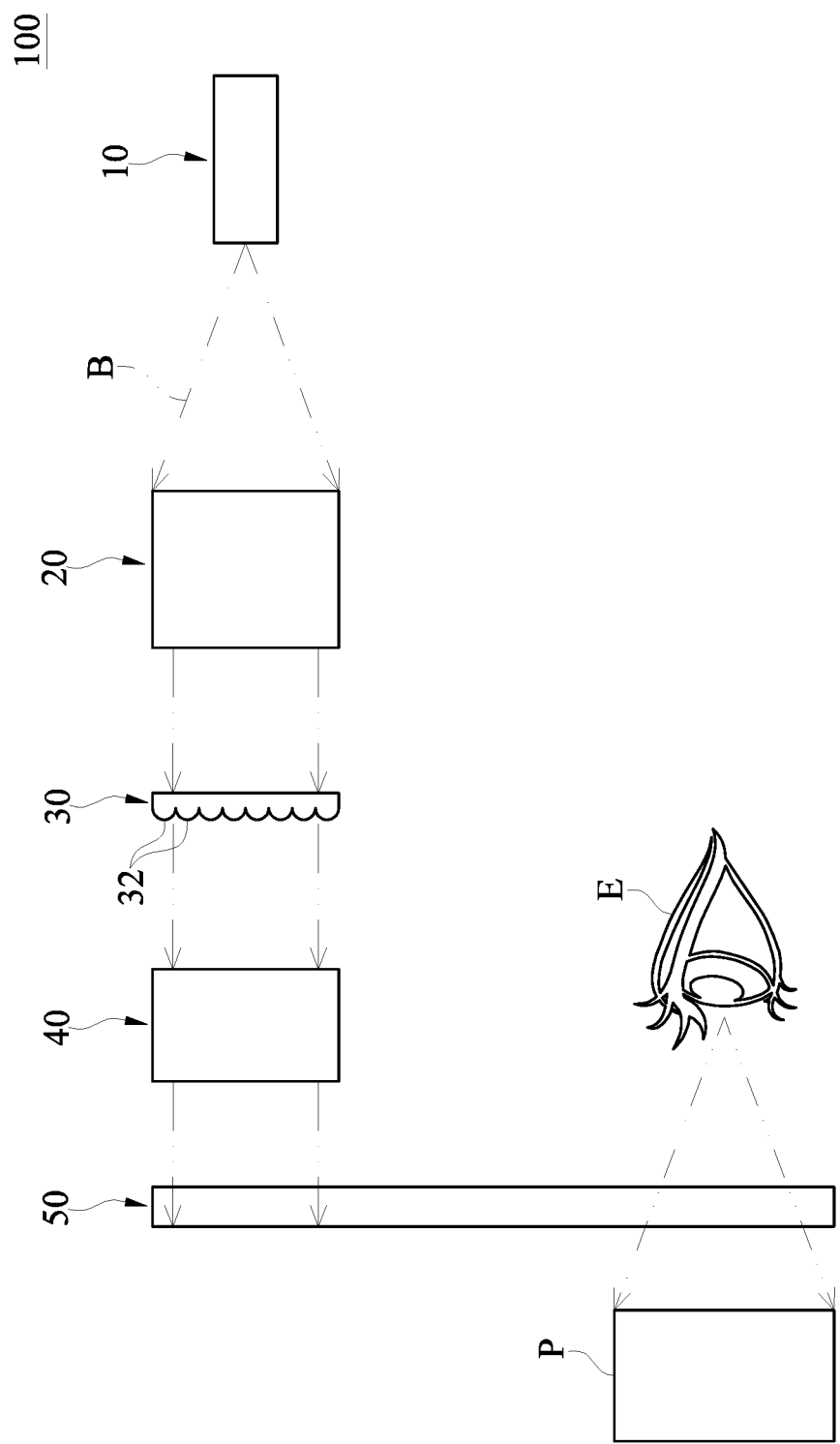
FIG. 1 is a schematic view of a laser optical projection module according to a first embodiment of the present disclosure.

The present disclosure is more particularly described in the following examples that are intended as illustrative only since numerous modifications and variations therein will be apparent to those skilled in the art. Like numbers in the drawings indicate like components throughout the views. As used in the description herein and throughout the claims that follow, unless the context clearly dictates otherwise, the meaning of "a", "an", and "the" includes plural reference, and the meaning of "in" includes "in" and "on". Titles or subtitles can be used herein for the convenience of a reader, which shall have no influence on the scope of the present disclosure.

The terms used herein generally have their ordinary meanings in the art. In the case of conflict, the present document, including any definitions given herein, will prevail. The same thing can be expressed in more than one way. Alternative language and synonyms can be used for any term(s) discussed herein, and no special significance is to be placed upon whether a term is elaborated or discussed herein. A recital of one or more synonyms does not exclude the use of other synonyms. The use of examples anywhere in this specification including examples of any terms is illustrative only, and in no way limits the scope and meaning of the present disclosure or of any exemplified term. Likewise, the present disclosure is not limited to various embodiments given herein. Numbering terms such as "first", "second" or "third" can be used to describe various components, signals or the like, which are for distinguishing one component/signal from another one only, and are not intended to, nor should be construed to impose any substantive limitations on the components, signals or the like.

First Embodiment

As shown in FIG. 1 to FIG. 5, a first embodiment of the present disclosure provides a laser optical projection module 100, which includes a laser beam scanning (LBS) device 10, a first optical lens assembly 20, a microlens array (MLA) 30, a second optical lens assembly 40, and an optical see-through element 50. The first optical lens assembly 20 is configured on a side of the laser beam scanning device 10. The microlens array 30 and the laser beam scanning device 10 are each correspondingly disposed on a side of the first optical lens assembly 20. The second optical lens assembly 40 and the first optical lens assembly 20 are each correspondingly disposed on a side of the microlens array 30. The optical see-through element 50 and the microlens array 30 are each correspondingly disposed on a side of the second optical lens assembly 40. Further, a human eye E and an image P are shown to be at two sides of the optical see-through element 50, respectively, so as to demonstrate a technical feature achieved in the present disclosure. An image light beam generated by the laser beam scanning device 10 sequentially passes through the first optical lens assembly 20, the microlens array 30, and the second optical lens assembly 40. After the image light beam enters the optical see-through element 50, a part of the light penetrates through the optical see-through element 50, and a part of the light is reflected to enter the human eye E. The virtual image P can be seen by the human eye E through the optical see-through element 50.

Figure 2:
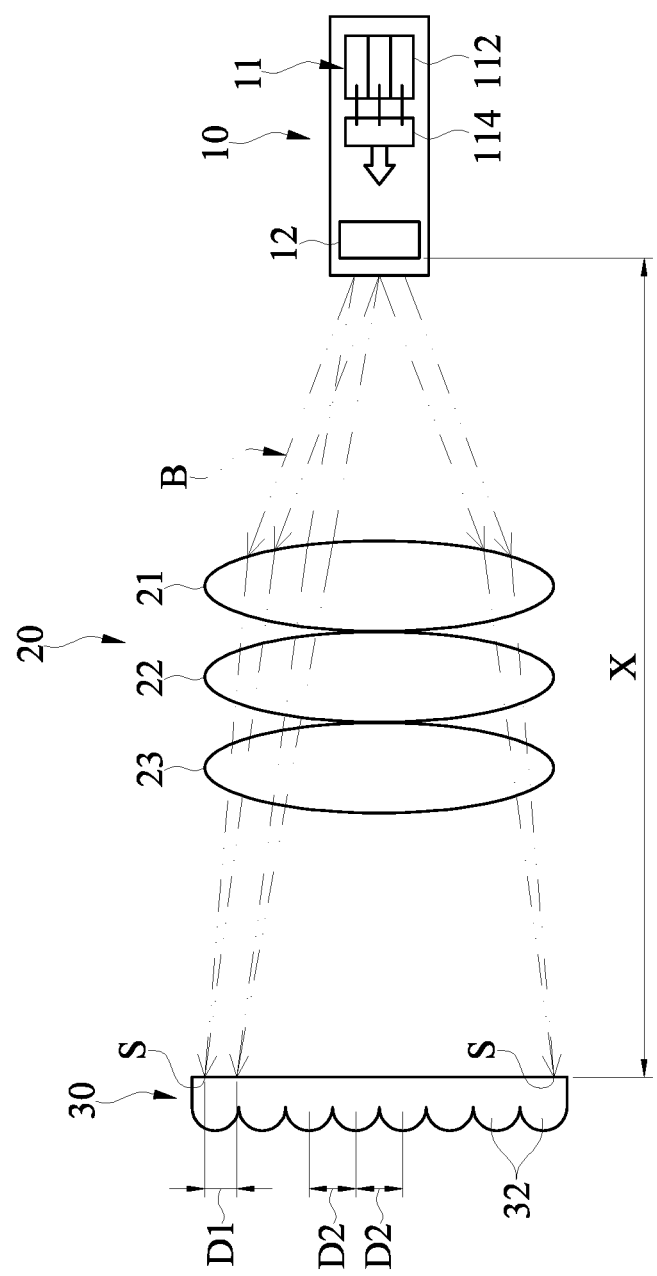
FIG. 2 is a schematic view showing a laser beam being emitted to a microlens array according to the present disclosure.

As shown in FIG. 2, the laser beam scanning device 10 has a laser light source 11 and a micro-electro-mechanical micromirror 12. A laser beam emitted from the laser light source 11 is projected to the micro-electro-mechanical micromirror 12. The laser light source 11 includes a laser module 112 having three laser diodes that respectively emit a red laser light, a green laser light, and a blue laser light, and the laser light source 11 emits a collimated laser beam through a collimation unit 114. However, lasers with other colors can also be used in the present embodiment. The laser light source 11 can emit a monochrome laser, and the micro-electro-mechanical micromirror 12 can be a scanning mirror of a micro-electro-mechanical system (MEMS). The laser beam is projected to the swinging micro-electro-mechanical micromirror 12 and then reflected to corresponding pixels to scan out a graphic image in a space.

The micro-electro-mechanical micromirror 12 of the present disclosure is different from traditional projection techniques involving liquid crystal on silicon (LCOS) and digital light processing (DLP). A LCOS using liquid crystal molecules for reflection has disadvantages of poor luminance and resolution, high power consumption, and large volume. A DLP projection is implemented by using micro-reflecting mirrors of a digital micromirror device (DMD) arranged in an array to reflect light, so as to produce a graphic image. Both techniques require an external white light source, which would increase an overall volume of an AR device. Compared with the two techniques mentioned above, the micro-electro-mechanical micromirror 12 has advantages of small volume, high luminance, and low power consumption and heat generation. Therefore, the micro-electro-mechanical micromirror 12 can serve as an optical engine in the AR device.

As shown in FIG. 2, the first optical lens assembly 20 of the present embodiment is configured on a light emergent side of the laser beam scanning device 10, and has a plurality of first lenses 21, 22, 23. The first lenses 21, 22, 23 can be a combination of convex and concave lenses. In the present embodiment, each of the first lenses 21, 22, 23 of the first optical lens assembly 20 has an irregular curved surface, so that light spots S of a laser beam B emitted from the laser beam scanning device 10 can be reduced, and a pitch D1 between the light spots S can be decreased. As a distance between the first optical lens assembly 20 and the laser beam scanning device 10 becomes smaller, a size of the first optical lens assembly 20 will be reduced. In consideration of a size of the microlens array 30, an effective focal length of the first optical lens assembly 20 can be designed to be smaller correspondingly.

Figure 3:
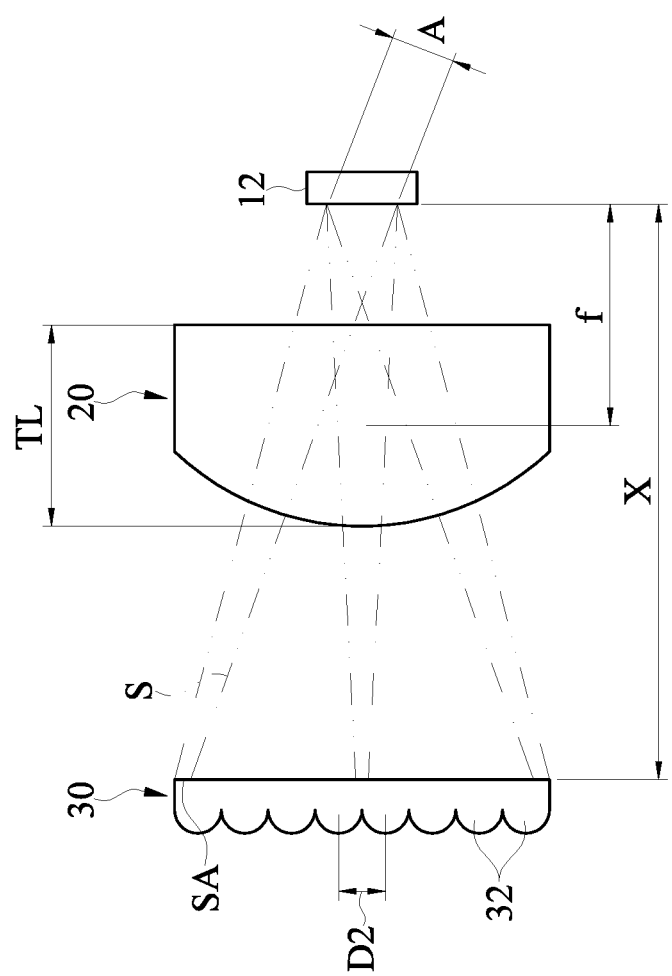
FIG. 3 is a schematic view showing a size of each light spot being reduced by a first optical lens assembly according to the present disclosure.

As shown in FIG. 2 and FIG. 3, the microlens array (MLA) 30 is configured on a side of the first optical lens assembly 20 and on a projecting direction of the laser beam B passing through the first optical lens assembly 20. In other words, the first optical lens assembly 20 is located between the laser beam scanning device 10 and the microlens array 30. The microlens array 30 has a plurality of microlenses 32 which are arranged in an array. In the present embodiment, the microlenses 32 can be formed on a side or two sides of a transparent substrate as plano-convex or biconvex microlenses. A uniform imaging image formed by the uniform and parallel imaging lights can be obtained after the laser beam B passes through the microlenses 32. Accordingly, the present disclosure is capable of providing imaging lights that are uniform and parallel to each other.

In the present embodiment, the microlenses 32 are convex lenses. A same pitch D2 is defined between any two of the microlenses 32 that are adjacent to each other. The size of each of the light spots S of the laser beam scanning device 10 is equal to or smaller than the pitch D2 between two adjacent ones of the microlenses 32. A better resolution can be provided when the pitch D2 between two adjacent ones of the microlenses 32 becomes shorter and the size of each of the light spots S of the laser beam B becomes smaller. For example, if the microlens array 30 has a length of 12 mm and a width of 6 mm, and an incidence from the laser beam scanning device 10 into the microlens array 30 through the first optical lens assembly 20 has 1024×768 scanning points, the pitch D2 of the microlens array 30 is 12 mm/1024=11.7 μm. The pitch D1 between the light spots S generated by the laser beam scanning device 10 needs to be 11.7 μm, and the size of each of the light spots S of the laser beam B is equal to or smaller than 11.7 μm.

In another example, in order to enhance the resolution in the present disclosure, a distance X between the laser beam scanning device 10 and the microlens array 30 is reduced. Accordingly, the size of the microlens array 30 would also need to be reduced. If the microlens array 30 has a length of 6 mm and a width of 3 mm, and an incidence from the laser beam scanning device 10 into the microlens array 30 through the first optical lens assembly 20 has 1024×768 scanning points, the pitch D2 of the microlens array 30 is 6 mm/1024=5.8 μm.

Based on the above examples, in the present embodiment, the pitch D2 between two of the microlenses 32 of the microlens array 30 is from 5 micrometers (μm) to 12 micrometers (μm). However, the present disclosure is not limited thereto.

One characteristic of the present disclosure is to arrange the first optical lens assembly 20 between the laser beam scanning device 10 and the microlens array 30. The size of each of the light spots S generated by the laser beam scanning device 10 can be reduced by the first optical lens assembly 20, so as to reduce the size of the microlens array 30 and enhance the resolution. Conversely, if the first optical lens assembly 20 is omitted, the size of each of the light spots S generated by the laser beam scanning device 10 would be limited by a size of the micro-electro-mechanical micromirror 12 and cannot be reduced.

When the laser beam B generated by the laser beam scanning device 10 passes through multiple first lenses of the first optical lens assembly 20 that have irregular curved surfaces, a course of light is changed due to the irregular curved surfaces, which may include a phase change and an optical path change.

As shown in FIG. 2 and FIG. 3, in the present embodiment, when the pitch D2 of the microlens array 30 is the same as the size of each of the light spots S, speckles can be reduced to provide a better imaging quality. The present embodiment is capable of reducing a light spot size of the laser beam scanning device 10 through configuration of the first optical lens assembly 20. Therefore, a thickness TL of the first optical lens assembly 20 together with a focal length f of the first optical lens assembly 20 is less than or equal to a distance X between the micro-electro-mechanical micromirror 12 and the microlens array 30 when a size SA of each of the light spots S is equal to the pitch D2.

As shown in FIG. 3, in the present embodiment, before the first optical lens assembly 20 is configured, it should first be determined whether the focal length f of the first optical lens assembly 20 meets a system design. According to a relation of f-theta lens, light spot size=$C*\lambda*(f/A)$. C is a factor of apodization and is related to the material of a lens, $\lambda$ is a wavelength, f is an effective focal length, and A is a light beam size.

Figure 4:
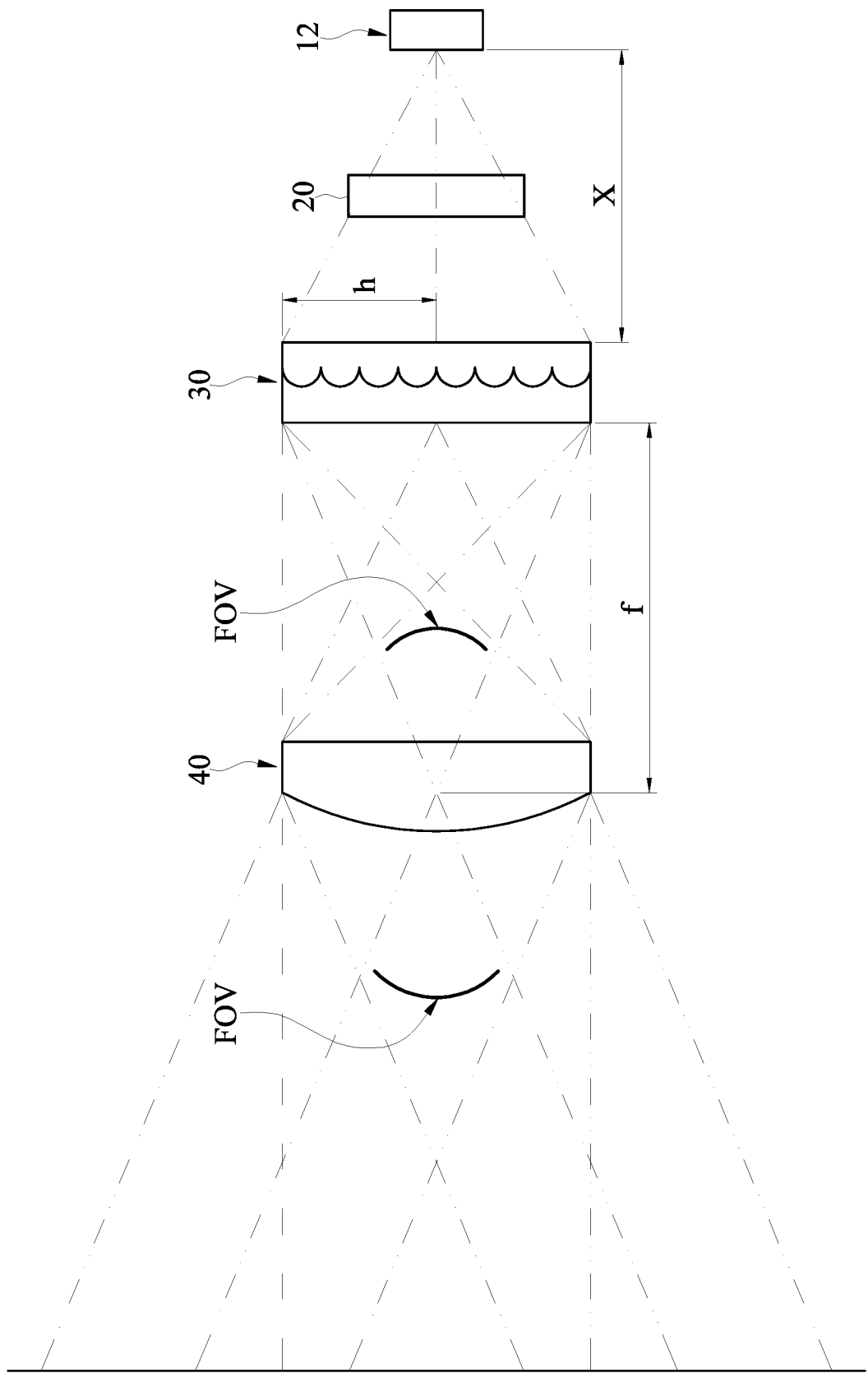
FIG. 4 is a schematic view showing the laser optical projection module projecting an image according to the present disclosure.

As shown in FIG. 4, the second optical lens assembly 40 is configured on a side of the microlens array 30 to receive uniform and parallel imaging lights of the microlens array 30. The second optical lens assembly 40 enlarges an imaging image, so that every light spot of the microlens array 30 can effectively enter the optical see-through element 50. The light spots of the microlens array 30 each represent an object point as shown in an image, and a light emitted by each object point has a divergence angle. One aim of the laser optical projection module 100 in the present disclosure is to have a final virtual image being formed at an infinite far place. Therefore, an optical path and an optical type of the light spots of the microlens array 30 can be modified by the second optical lens assembly 40. Specifically, the second optical lens assembly 40 can have a plurality of second lenses. The second lenses each have a different refractive index and a different dispersion coefficient from each other, such as a combination of high refractive and low refractive materials, and a combination of high dispersion and low dispersion materials. Accordingly, an aberration and a chromatic aberration can be reduced. A surface shape and a thickness of the second lenses used in the present embodiment make lights from different angles eventually enter the optical see-through element 50 in parallel with each other. Moreover, different object points will move forward in their respective directions, i.e., the second optical lens assembly 40 modifies imaging lights which pass through the microlens array 30, such that the imaging lights from different angles enter the optical see-through element 50 in parallel with each other.

In the present embodiment, a shape of the second lens assembly 40 can cooperate with a shape of the optical see-through element 50. To be specific, if the optical see-through element 50 has a ratio of length to width of 16:9, an external shape of the second lens assembly 40 in the present embodiment can also be designed to have a ratio of 16:9, so as to obtain its smallest volume.

As shown in FIG. 2, the laser optical projection module of the present disclosure can include only the laser beam scanning device 10, the first optical lens assembly 20, and the microlens array 30 to project an image. In other words, the laser beam B emitted from the laser optical projection module of the present disclosure does not necessarily need to be projected to the optical see-through element 50.

Figure 5:
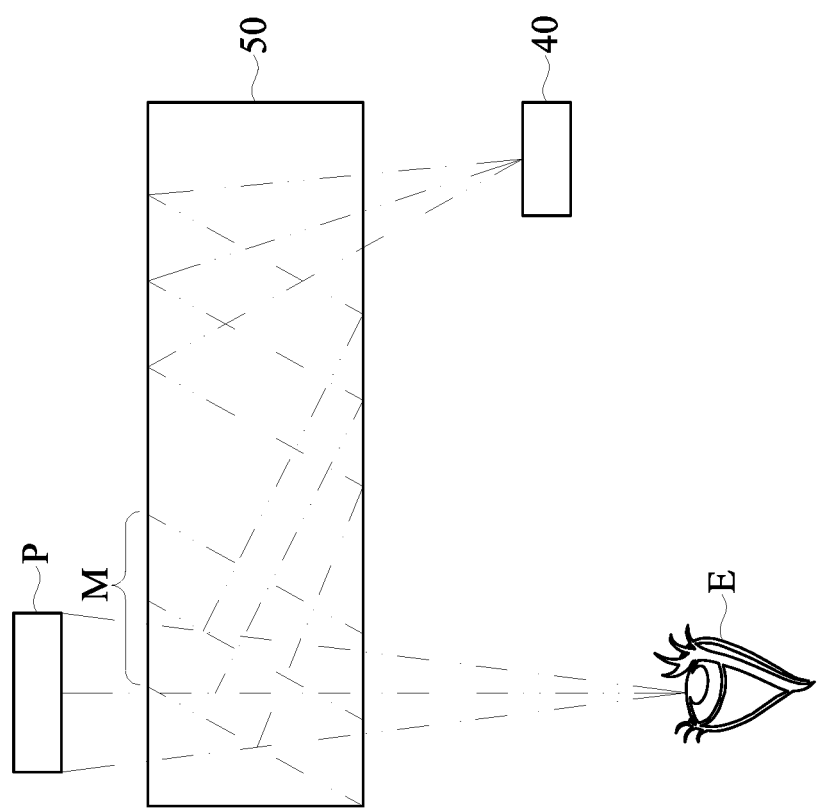
FIG. 5 is a schematic view showing light passing through an optical see-through element and being seen by a human eye according to the present disclosure.

As shown in FIG. 4 and FIG. 5, the optical see-through element 50 is configured on a light emergent side of the second optical lens assembly 40. In the present embodiment, the optical see-through element 50 can be, for example, a light-guide optical element (LOE), and includes a plurality of semi-transflective lenses M that are adhesively bonded. Each of the semi-transflective lenses M has a multilayered coating to receive the imaging image enlarged by the second optical lens assembly 40. The imaging image enlarged by the second optical lens assembly 40 is reflected to the human eye E by the optical see-through element 50, such that an enlarged optical image P can be seen by the human eye E through the optical see-through element 50.

An important imaging parameter is a field of view (FOV), also known as a visual field or a field of vision. The FOV is related to a size of an image seen by the human eye E. The FOV can be altered by design, and different FOVs would affect the size and position of the microlens array 30.

Reference is made to FIG. 4. Relations between the field of view (FOV) and the microlens array (MLA) 30 with respect to size and pitch are shown below.

Diagonal FOV=$2*\tan^{-1}$(MLA diagonal size/$2/f$), according to half an image height=effective focal length (EFL)*tan(half FOV).

Supposing a ratio of length to width of the microlens array (MLA) 30 is 16:9, a horizontal size (width) of the microlens array (MLA) 30 is:

MLA $H$ size=$d*16/((16^2+9^2)^0.5)$;

wherein d is a diagonal size of the microlens array 30. A vertical size (height) of the microlens array 30 is:

MLA $V$ size=$d*9/((16^2+9^2)^0.5)$.

Based on a resolution of 1024×600, a horizontal pitch of the microlens array 30 is MLA H size/1024, and a vertical pitch of the microlens array 30 is MLA V size/600.

In a more specific example, the field of view of the present embodiment is set to be 30 degrees, and the focal length f, i.e., an effective focal length of the second optical lens assembly 40, is determined to be 25.7 mm. While 0.5*d/25.7=tan(30°/2), the diagonal size of the microlens array 30 is d=2*tan(30°/2)*25.7=13.77 mm. Since the diagonal size of the microlens array 30 is calculated to be 13.77 mm, and a displayed image has a 16:9 ratio, it can be derived that the MLA H size=12 mm, and the MLA V size=6.75 mm.

Based on the resolution of 1024×600, it can be derived that the horizontal pitch of the microlens array 30 is 12 mm/1024=11.72 μm, and the vertical pitch of the microlens array 30 is 6.75 mm/600=11.25 μm.

After the size of the microlens array 30 is determined, the distance X between the microlens array 30 and the micro-electro-mechanical micromirror 12 can also be determined. Here, h is half a height of the microlens array 30 (i.e., 6.75/2 mm). Since a size of an image projected by the micro-electro-mechanical micromirror 12 varies with distance, in order to meet the requirements of the present design, the size of the image projected by the micro-electro-mechanical micromirror 12 needs to be the same as the size of the microlens array 30. If half a horizontal scanning angle of the micro-electro-mechanical micromirror 12 is 20.13° and half a vertical scanning angle is 11.65°, an equation for the above-mentioned distance X is as follows:

$X=h/\tan(11.65°)=(6.75/2)/\tan(11.65°)=16.37$ mm.

Second Embodiment

Figure 6:
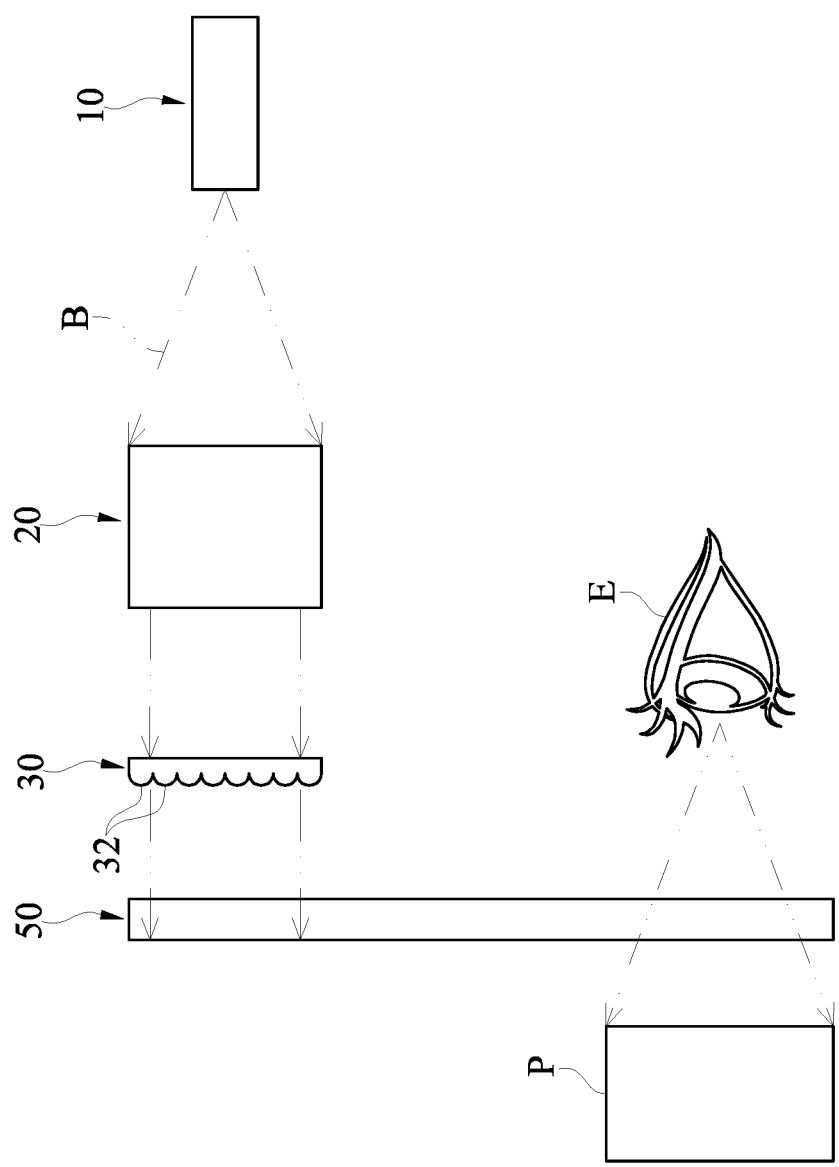
FIG. 6 is a schematic view of a laser optical projection module according to a second embodiment of the present disclosure.

As shown in FIG. 6, a laser optical projection module according to a second embodiment of the present disclosure is provided. The main difference between the second embodiment and the embodiment of FIG. 1 is that the second optical lens assembly 40 is omitted. The present embodiment includes the laser beam scanning device 10, the first optical lens assembly 20, the microlens array 30, and the optical see-through element 50. A uniform imaging image formed by the uniform and parallel imaging lights is obtained after the laser beam B passes through the microlenses 32 of the microlens array 30. Therefore, even without the second optical lens assembly 40, uniform and parallel imaging lights can still enter the optical see-through element 50 in the present disclosure.

Figure 7:
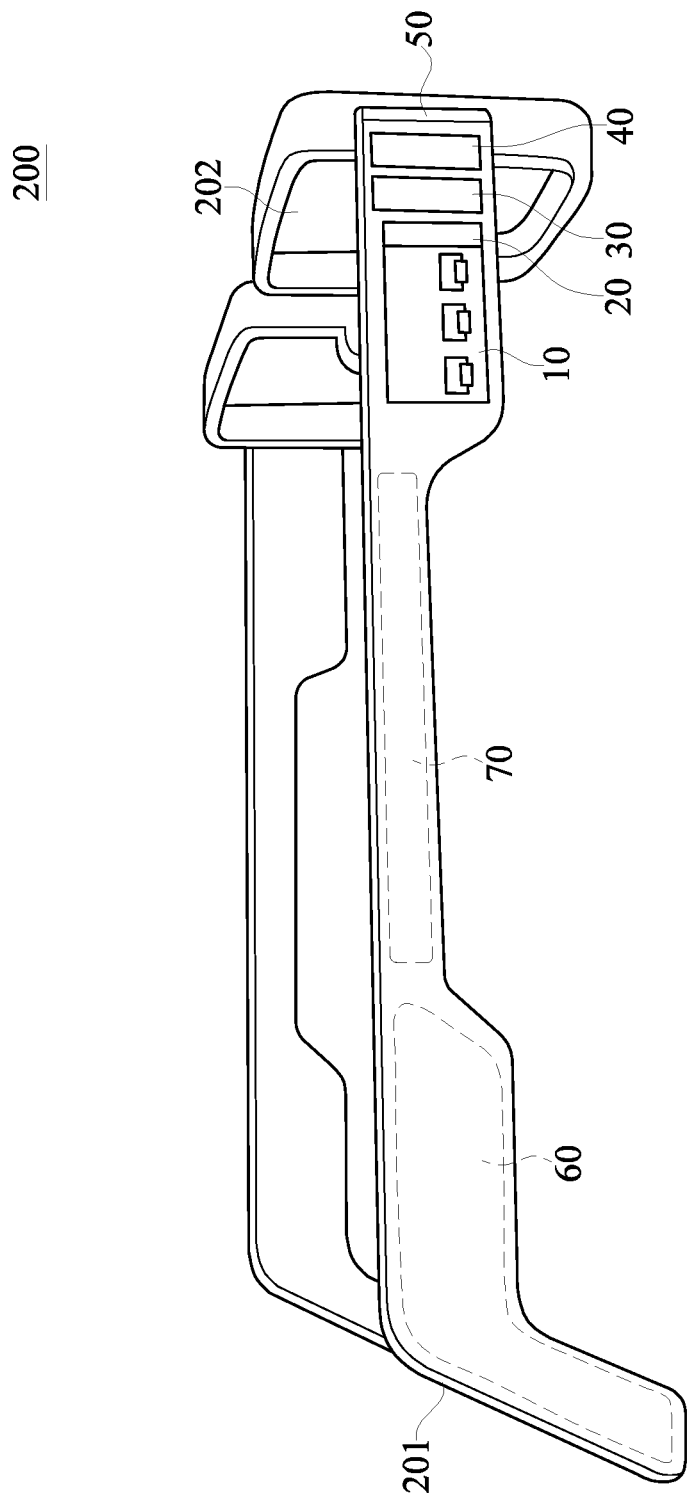
FIG. 7 is a schematic view of a wearable device having a laser optical projection module according to the present disclosure.

As shown in FIG. 7, the laser optical projection module 100 of the present disclosure can be applied to a wearable device so as to provide an AR display image. Specifically, the following is described by using optical projection glasses 200 as an example. The optical projection glasses 200 includes the laser beam scanning device 10, the first optical lens assembly 20, the microlens array 30, the second optical lens assembly 40, and the optical see-through element 50. The laser beam scanning device 10, the first optical lens assembly 20, the microlens array 30, and the second optical lens assembly 40 are configured in an eyeglass frame 201 of the optical projection glasses 200. The optical see-through element 50 is integrated with an eyeglass lens 202 of the optical projection glasses 200. Furthermore, a power supply device 60 and a control circuit board 70 can be installed in the eyeglass frame 201. The power supply device 60 can provide electricity to the laser beam scanning device 10, and the control circuit board 70 can be connected to an external device (not shown in the figure) to transmit relevant information to the laser beam scanning device 10. However, the present disclosure is not limited thereto. The laser optical projection module 100 of the present disclosure can also serve as an optical engine in other image projection devices, such as a virtual reality (VR) device and a heads-up display device.

The foregoing description of the exemplary embodiments of the disclosure has been presented only for the purposes of illustration and description and is not intended to be exhaustive or to limit the disclosure to the precise forms disclosed. Many modifications and variations are possible in light of the above teaching.

The embodiments were chosen and described in order to explain the principles of the disclosure and their practical application so as to enable others skilled in the art to utilize the disclosure and various embodiments and with various modifications as are suited to the particular use contemplated. Alternative embodiments will become apparent to those skilled in the art to which the present disclosure pertains without departing from its spirit and scope.

What is claimed is:
1. A laser optical projection module, comprising:
a laser beam scanning device having a laser light source and a micro-electro-mechanical micromirror, wherein a laser beam emitted from the laser light source is projected to the swinging micro-electro-mechanical micromirror and then reflected to corresponding pixels to scan out a graphic image;
a first optical lens assembly configured on a side of the laser beam scanning device and having a plurality of first lenses, wherein light spots of the laser beam emitted from the laser beam scanning device are reduced by the first lenses, and a pitch between the light spots is decreased; and a microlens array configured on a side of the first optical lens assembly and on a projecting direction of the laser beam passing through the first optical lens assembly, wherein the microlens array has a plurality of microlenses which are arranged in an array, and a uniform imaging image formed by the uniform and parallel imaging lights is obtained after the laser beam passes through the microlenses, wherein each of the first lenses of the first optical lens assembly has an irregular curved surface.

2. The laser optical projection module according to claim 1, wherein the microlenses are convex lenses or biconvex lenses, a same pitch is defined between two of the microlenses adjacent to each other, and a size of each of the light spots of the laser beam scanning device is equal to or smaller than the pitch between two of the microlenses.

3. The laser optical projection module according to claim 2, wherein the pitch between two of the microlenses of the microlens array is from 5 micrometers to 12 micrometers.

4. The laser optical projection module according to claim 2, wherein a sum of a thickness of the first optical lens assembly and a focal length of the first optical lens assembly is less than or equal to a distance between the micro-electro-mechanical micromirror and the microlens array when the size of each of the light spots of the laser beam scanning device is equal to the pitch between two of the microlenses.

5. The laser optical projection module according to claim 1, further comprising a second optical lens assembly, wherein the second optical lens assembly is configured on a side of the microlens array to receive the imaging image of the microlens array, and the imaging image is enlarged by the second optical lens assembly.

6. The laser optical projection module according to claim 5, wherein the second optical lens assembly has a plurality of second lenses, and the second lenses each have a different refractive index and a different dispersion coefficient from each other.

7. The laser optical projection module according to claim 5, further comprising an optical see-through element, wherein the optical see-through element is configured on a side of the second optical lens assembly, the optical see-through element includes a plurality of semi-transflective lenses that are adhesively bonded, and each of the semi-transflective lenses has a multilayered coating to receive the imaging image enlarged by the second optical lens assembly.

8. The laser optical projection module according to claim 7, wherein the second optical lens assembly modifies the imaging lights which pass through the microlens array, such that the imaging lights from different angles enter the optical see-through element in parallel with each other.

9. A wearable device having a laser optical projection module, comprising:

a laser beam scanning device having a laser light source and a micro-electro-mechanical micromirror, wherein a laser beam emitted from the laser light source is projected to the swinging micro-electro-mechanical micromirror and then reflected to corresponding pixels to scan out a graphic image;

a first optical lens assembly configured on a side of the laser beam scanning device and having a plurality of first lenses, wherein light spots of the laser beam emitted from the laser beam scanning device are reduced by the first lenses, and a pitch between the light spots is decreased;

a microlens array configured on a side of the first optical lens assembly and on a projecting direction of the laser beam passing through the first optical lens assembly, wherein the microlens array has a plurality of microlenses which are arranged in an array, and a uniform imaging image formed by the uniform and parallel imaging lights is obtained after the laser beam passes through the microlenses;

a second optical lens assembly configured on a side of the microlens array to receive the imaging image of the microlens array, wherein the imaging image is enlarged by the second optical lens assembly; and an optical see-through element configured on a side of the second optical lens assembly, wherein the optical see-through element includes a plurality of semi-transflective lenses that are adhesively bonded, and each of the semi-transflective lenses has a multilayered coating to receive the imaging image enlarged by the second optical lens assembly.

* * * * *